DRUM RECORDING MECHANISM FOR OSCILLOGRAPHS

Filed Aug. 13, 1952 5 Sheets-Sheet 1

INVENTORS.
Warren D. Tilton Jr.
Claude M. Hathaway
By Alois W. Graf
Att'y.

INVENTORS.
Warren D. Tilton Jr
Claude M. Hathaway
By Alois W. Graf Att'ys.

INVENTORS.
Warren D. Tilton Jr.
Claude M. Hathaway
By Alois W. Graf Att'ys.

INVENTORS.
Warren D. Tilton Jr.
Claude M. Hathaway
By Alois W. Graf Att'y.

DRUM RECORDING MECHANISM FOR OSCILLOGRAPHS

Filed Aug. 13, 1952 5 Sheets-Sheet 5

INVENTORS.
Warren D. Tilton Jr.
Claude M. Hathaway
By Alvin W. Graf
Att'y.

United States Patent Office 2,726,919

Patented Dec. 13, 1955

2,726,919

DRUM RECORDING MECHANISM FOR OSCILLOGRAPHS

Claude M. Hathaway and Warren D. Tilton, Jr., Denver, Colo., assignors to Hathaway Instrument Company, Denver, Colo., a corporation of Colorado Application August 13, 1952, Serial No. 304,058

10 Claims. (Cl. 346—110)

The present invention relates to a recording oscillograph and more particularly to an improved drum recording mechanism and a cooperating control system.

A six channel cathode ray oscillograph was described in The Proceedings of the National Electronics Conference 1950, volume 1, pages 373 through 379. In certain applications of an oscillograph of this kind it has been found desirable to provide a recording mechanism having a comparatively wide range of recording speed from 4.5 to 600 inches per second. It furthermore was found to be desirable to provide an arrangement whereby a supply of record material could be advanced automatically thereby to obviate the necessity of reloading the recording device after each record had been taken.

Accordingly a drum type record magazine using 35 mm. film was proposed which would provide for a single recording one, two or three foot lengths of film. This was accomplished by providing a drum type record magazine having within the drum the film supply and take-up reels together with certain control mechanism for selectively advancing the film as required and for controlling this operation from a suitable control panel which at the same time coordinated the operation of the drum type record magazine with the operation of the cathode ray recording oscillograph.

It, therefore, is an object of the present invention to provide an improved cathode ray oscillograph recording system.

Another object of the invention is to provide an improved cathode ray oscillograph recording system having automatic controls for a drum type record magazine and the operation of the cathode ray tubes of the oscillograph.

Still another object of the invention is to provide for an oscillograph a drum type recording mechanism.

Still another object of the invention is to provide for a cathode ray oscillograph a drum type recording mechanism having a self-contained numbering mechanism for each length of film exposed as a record.

Still another object of the invention is to provide an improved drum recording mechanism having means for advancing the recording film by selected predetermined amounts.

A still further object of the invention is to provide an improved drum recording mechanism for making a record on a selected predetermined amount of film on the periphery of the drum.

Other and further objects of the invention subsequently will become apparent by reference to the following description taken in conjunction with the accompanying drawings wherein.

Figure 1:
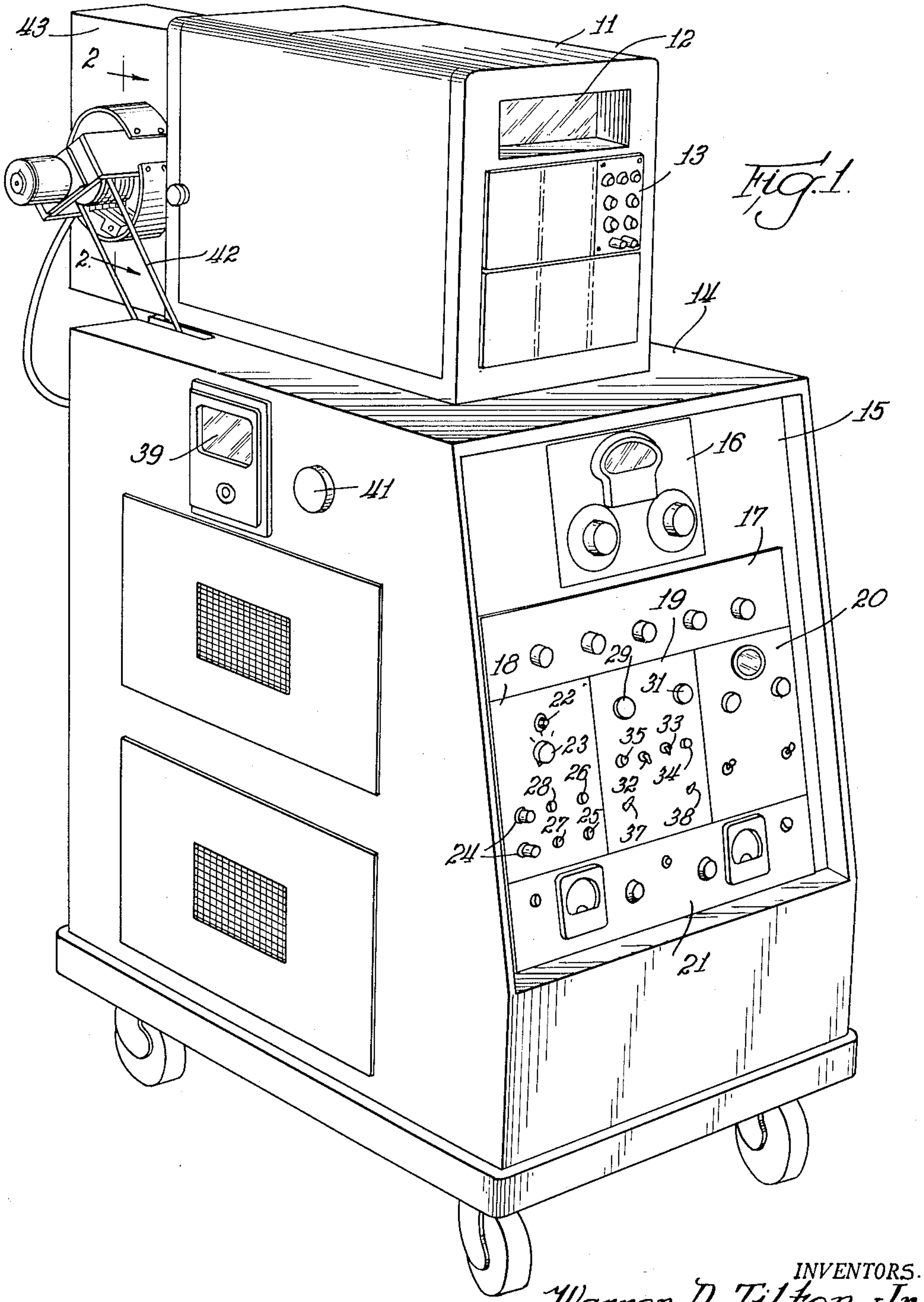
Figure 1 is a perspective view of a multi-element cathode ray oscillograph, a drum type record magazine, and a control cabinet.

In Figure 1 of the drawing there is shown a multi-element cathode ray oscillograph having a cabinet 11 provided with an opening terminating in a viewing screen 12. The cabinet 11 at its front carries six panels 13 each of which is provided with a plurality of control knobs for actuating controls by which attenuation, focus, vertical and horizontal scanning, gain and intensity may be regulated. The details of an oscillograph of this type have been described in The Proceedings of the National Electronics Conference, volume 6, beginning on page 373 and in a catalog sheet of the Hathaway Instrument Company of Denver, Colorado, Section 2, Division G, Sheet 1. The details of this cathode ray oscillograph, therefore, do not require specific description or disclosure in the present specification.

The cathode ray oscillograph 11 is shown mounted on a cabinet 14 which has a front panel 15 carrying a plurality of subpanels 16, 17, 18, 19, 20 and 21. The panel 16 comprises a calibration voltmeter provided for certain operations in setting up the oscillograph for particular operating conditions.

The panel 17 provides the control for a sweep unit which is used when the oscillograph 11 is employed for viewing purposes only.

The panel 18 is a part of a synchronizing unit which is used to intensify the beams of the cathode ray tubes of the oscillograph 11 for one foot, two feet or three feet records. The panel 18 carries a push button 22 which is actuated when a different type of recording drum is provided for continuous recording. Immediately beneath the push button 22 is a knob for a switch 23 for selecting the record length of one, two or three feet. Two binding posts 24 are provided to obtain a synchronous output when needed. Connection may be made to these binding posts to initiate an electrical circuit which creates a transient to be recorded. The binding posts are connected to a set of relay contacts located within the synchronizing unit 18 which are closed when the cathode ray tubes are intensified. The relay contacts close approximately one millisecond after the tubes are intensified. A push button 25 is provided to initiate operation of the unit. It has the effect of providing an impulse obtained from the recording drum which is supplied to a multi-vibrator so that the first time that the recording drum rotates in a position to make the "start" trigger contact, the multi-vibrator operates, and consequently the cathode ray tubes are intensified. The first time that the drum comes into the position for the "end" contact, the cathode ray beams are cut off. Immediately above the push button 25 there is a pilot light 26 which operates to indicate that initiation has been accomplished. Another push button 27 is provided for resetting the oscillograph for another record. Immediately above this push button 27 is a pilot light 28 which is illuminated to indicate the condition of the oscillograph.

The panel 19 is for the control unit which coordinates the operation of the oscillograph and the drum type recording mechanism. The panel 19 carries a knob 29 connected to a switch for selecting the record length. Another knob 31 is connected to a rheostat which controls the lengths of exposure of the record numbering arrangement. A double throw switch 32 when in the down position is identified as "view intensity control" and in the up position as "record." The position of this switch selects or activates either of two intensity controls on each of the six panels 13. One of these controls determines the viewing intensity and the other the recording intensity. Another double throw switch 33 when in the down position is identified as "automatic beam" and in the up position by the word "on." When the switch is in the automatic position the cathode ray beams are automatically turned on and off by contacts on the drum of the recording mechanism. The switch 33 is moved to the "on" position for focusing the recording elements. To the right of the switch 33 is a push button 34 which enables the operator to check the signal applied to the recording elements as well as focus and intensity of the recording elements before a record is taken. When the switch is depressed the sweep voltage is applied to the recording elements and the intensity of the beams is maintained at their recording level regardless of the position of other switches that normally control the beam and sweep. To the left of the switch 32 is a push button 35 which is used to initiate operation of the catch advance motor located within the recording drum.

Two switches 37 and 38 are provided in the event that the control unit and the oscillograph are to be used with a continuous drive chart mechanism.

The panel 20 is associated with a timing unit which provides precision fifty cycle power to a synchronous motor in the synchronous time marker contained within the cabinet 11.

The panel 21 is the instrument unit panel for the oscillograph 11 and contains various switches for the purpose of main power and cathode ray voltage. Suitable voltmeters are provided for indicating the magnitudes of these voltages.

The cabinet 14 at its side contains an indicating instrument 39 which is a tachometer for showing the speed of the motor which is to drive the recording drum. A suitable control knob and mechanism 41 is provided for obtaining the desired speed from 16 different maximum speeds ranging from 4.5 to 600 inches per second. The motor contained within the cabinet 14 is connected by a belt 42 to the driving pulley of a drum type record magazine mechanism contained within the cabinet 43. Portions of the mechanism within the cabinet 43 are shown in detail in Figures 2 and 3.

Figure 2:
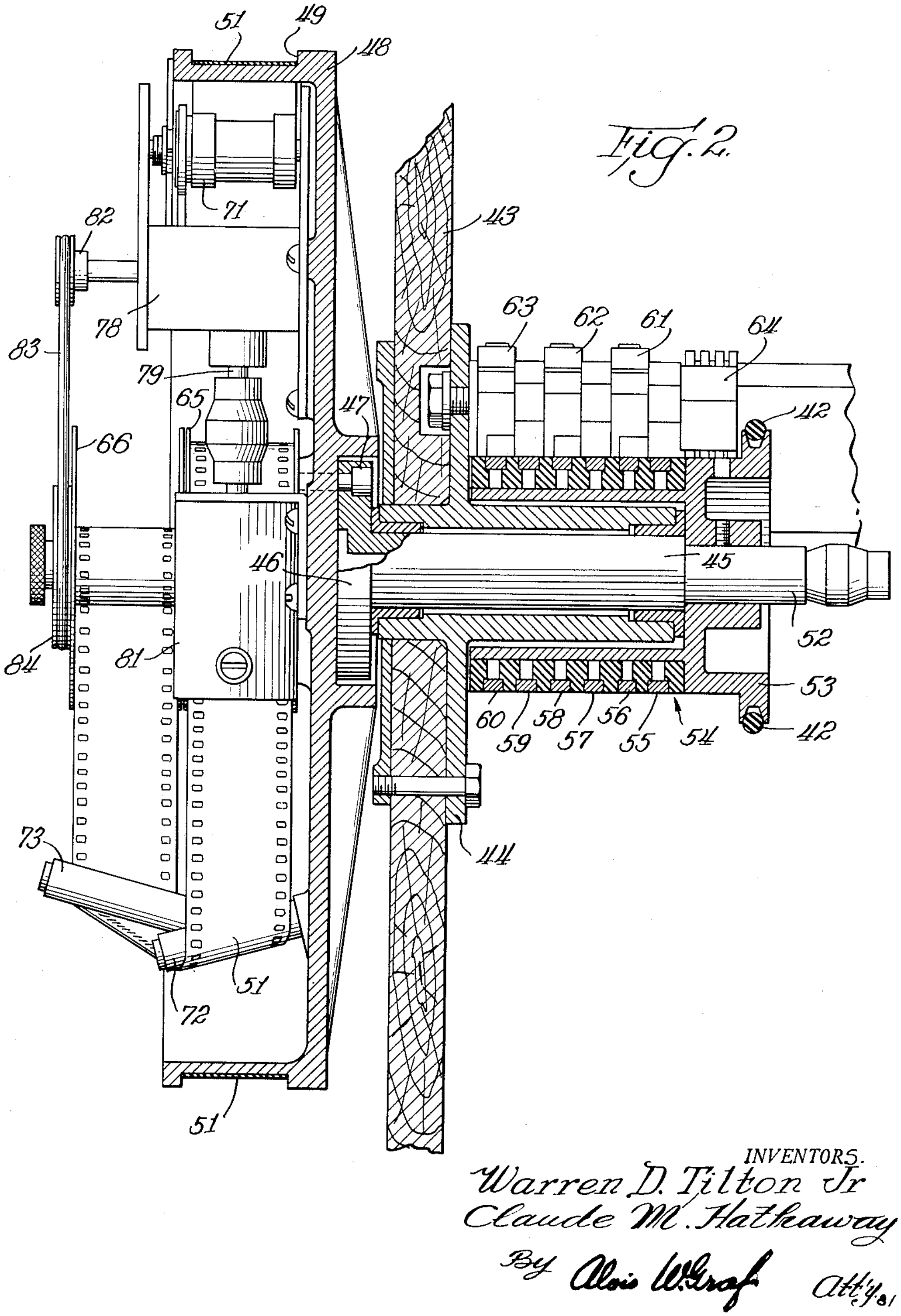
Figure 2 is an axial cross section of the recorder drum as seen in the direction of the arrows along the line 2—2 of Figure 1.
Figure 3:
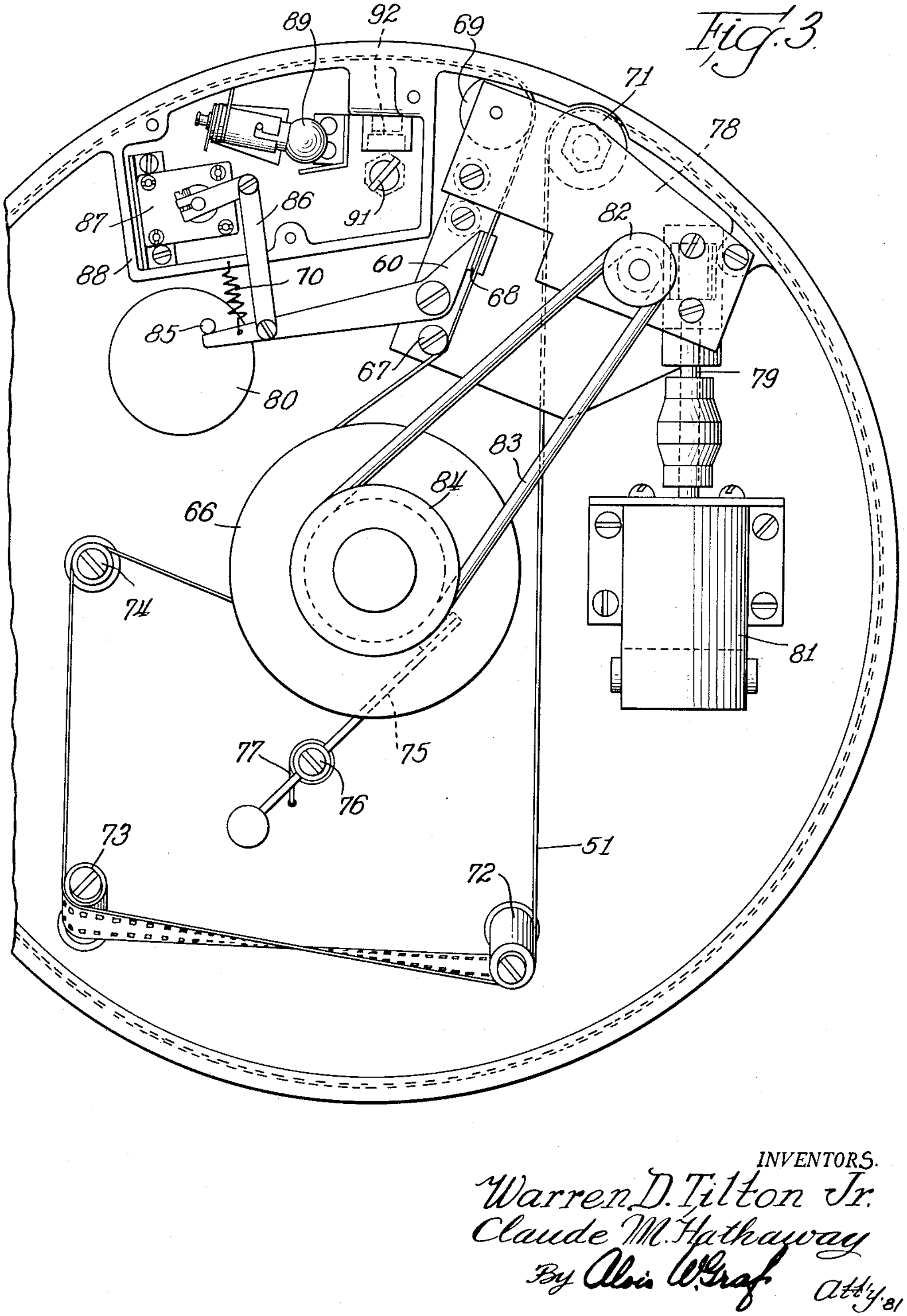
Figure 3 is a side view of a drum chart recorder mechanism.

Figure 2 shows that one wall of the cabinet 43 carries a support and bearing 44 for a shaft 45. The shaft 45 at one end has an enlarged portion 46 which is secured by bolts 47 to a drum 48 having a recessed periphery 49 about which is secured a recording film 51.

On the outside of the cabinet 43 the shaft 45 has a reduced diameter 52 on which is mounted a unitary structure having a pulley portion 53 engaged by the belt 42 and a slip ring portion 54 having six rings, 55, 56, 57, 58, 59 and 60. Contact is made to the slip rings 55 through 60 by a brush holder assembly comprising the members 61, 62 and 63. It will be noted that the holders 61, 62, and 63 appear to make contact with slip rings 56, 58 and 60 respectively. By an off-set structure not shown in the drawing but readily understood by those skilled in the art arms on the opposite side of the support make contact with slip rings 55, 57 and 59 respectively. To the right of the brush holders is a contact assembly 64 which is designated by the record length control contact assembly. The contacts of this assembly are responsive to angular portions of the drum 48 with respect to the shutter opening for the cabinet 43. As will subsequently become apparent this contact assembly is associated with the synchronizing unit to control the operation in accordance with the desired length of record to be made.

A film supply reel 65 is located adjacent the inner wall of the drum 48. A film take-up reel 66 is located on the same axis as the film supply reel 65. From the supply reel 65 the film passes over a guide post 67 and between the braking surfaces 68 of a film brake and about a roller 69 to the outer recessed surface 49 of the drum 48. From this recessed surface the film passes over a sprocket reel 71 from which it goes over a series of rollers 72, 73 and 74 to the take-up reel 66. A suitable brake 75 is pivotally supported on a stud 76 and biased by a spring 77 to apply a friction brake to the film on the supply reel 65.

The sprocket 71 is driven through a train of gears mounted behind a plate 78 and connected to the shaft 79 of a film advance motor 81. The shaft 79 of this motor is also connected by gears to a pulley 82 which is engaged by a belt 83 which drives a pulley 84. The pulley 84 drives the take-up reel 66 at a speed greater than the movement of the film so as to keep the film under tension whenever it is being advanced. The belt 83 is so selected that it can slip to a certain extent thereby having the same effect on the take-up reel 66 as a slip friction clutch drive would have.

One of the two braking surfaces 68 is mounted on a bell crank lever 60 which is biased by a spring 70. A torque motor 80 is provided with a pin 85 which engages one end of the bell crank lever 60. The torque motor 80 is connected to be energized at the same time that energy is supplied to the film advance motor 81.

The bell crank lever 60 actuated by the torque motor 80 and pin 85 is connected by a link 86 to a control or numbering device 87 mounted within an enclosure 88. A lamp 89 illuminates the indicia or numbers of the control 87 so that by means of a mirror 91 an image thereof may be transmitted through the optical system 92 to the film 51. Thus it will be appreciated that each time that film is advanced the control 87 will be actuated so as to present the next succeeding number. The lamp 89 is controlled so as to be illuminated for a time interval determined by the setting of the knob 31 on the control panel 19. The manner in which this is accomplished subsequently will become apparent upon the description concerning the circuit diagrams.

The operation of the present invention will be better appreciated upon an understanding of the broad mode of operation of the cathode ray recording oscillograph. Accordingly reference now may be made to Figure 4 which is a block diagram provided to facilitate an understanding of the mode of operation of the cathode ray oscillograph. In this block diagram a single cathode ray tube 101 has been indicated, although it is apparent from Figure 1 that six cathode ray tubes are provided. Each of the cathode ray tubes is suitably energized from three separate power supplies, not shown in Figure 4. Since the simplest type of operation of the oscillograph is that when it is used for viewing only the functions of the various units used for this purpose will first be described. A sweep oscillator 102 is connected to a sweep amplifier 103 which in turn is connected to two deflecting plates of the cathode tube 101. The sweep oscillator 102 generates a saw-toothed wave to provide the vertical time axis scanning of the cathode tube 101. When the oscillograph is used for viewing the sweep switch on the panel 17 is closed to energize the sweep oscillator and the sweep amplifier. The signal observed on the cathode tube 101 is at right angles to the ordinary oscilloscope presentation since during the recording time the recording chart moves in a vertical direction. The switch 104 is a part of a relay 105 which is automatically opened whenever the beam switch 33 of the control unit 19 is moved to the upper or "on" position. The relay 105 is connected to the circuit of the intensifier tube, which is cut out of the circuit when the switch is opened. Therefore, there is no current flowing through a resistor 106 so that the control grid of the cathode ray tube 101 is at the same potential as the lower terminal of a resistor 107. The viewing intensity control is connected so that the top of the resistor 107 is positive with respect to its lower terminal. The grid of the cathode ray tube may be at any potential with respect to the cathode dependent upon the setting of the viewing intensity control 108 which is located on the recording element control panel 13.

Figure 4:
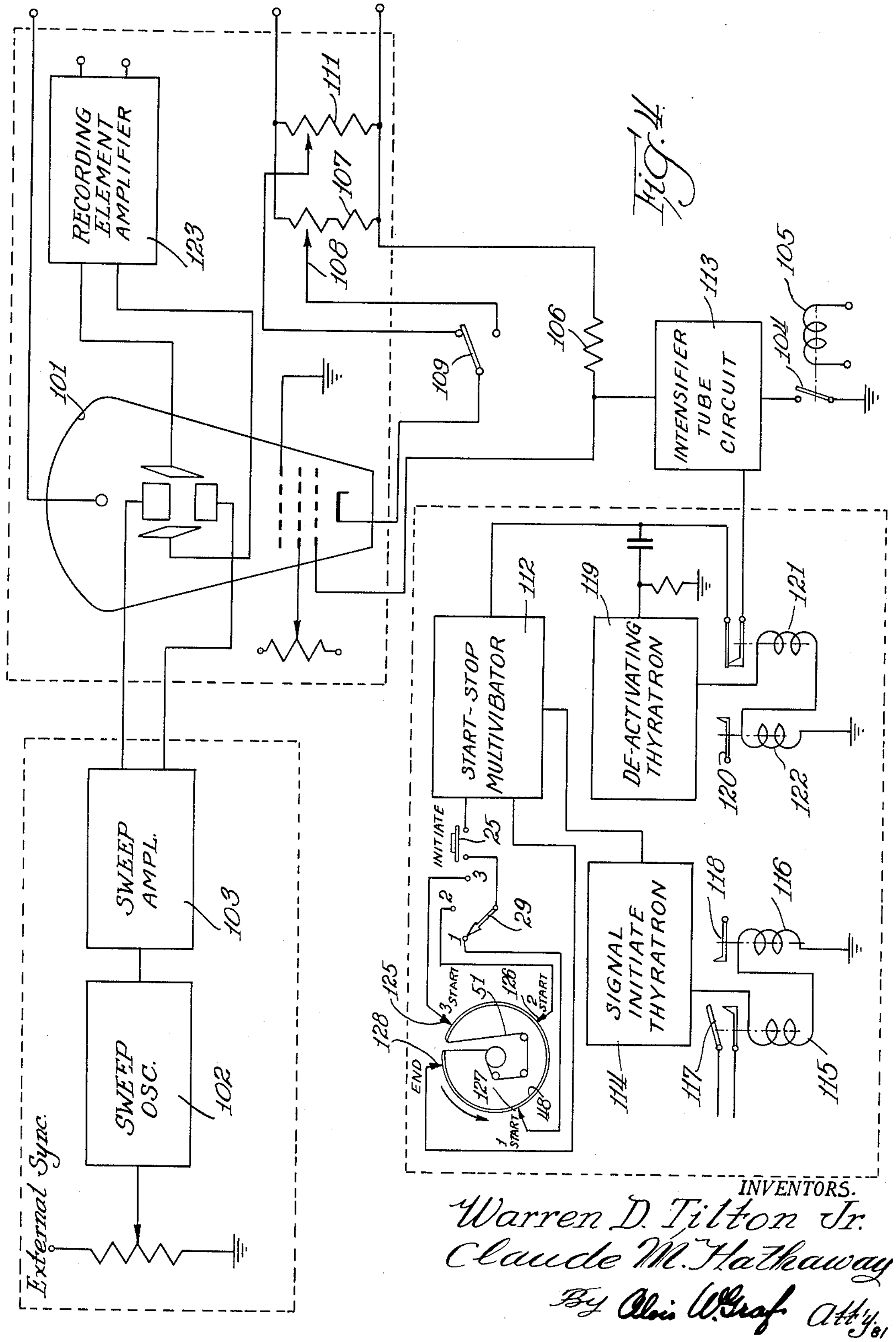
Figure 4 is a block diagram of the apparatus shown in Figure 1.

When the cathode ray tubes are to be used for recording purposes they are first focused with the intensity control switch 109 in the position shown in Figure 4 since the other position of the switch 109 is for viewing purpose. For this operation the switch 33 of the panel 19 is moved to its lower position. When the magazine motor is running the cathode ray tubes are automatically intensified by the action of the relay 105. It will be noted that the recording intensity control resistor 111 is not in series with any resistor such as the resistor 106. This permits the recording intensity to be set at a much higher value than the viewing intensity.

When the drum type recording magazine is used recording is initiated by the contacts on the drum marked 1 Start, 2 Start, 3 Start. The recording stops when the cathode ray tubes are deintensified by the engagement of the contact marked "end." Any one of the start contacts on the drum may be used to initiate the recording since this selection is made by the record length selector 29 of the control unit 19. When the initiate switch 25 of the synchronizing unit 18 is depressed a circuit is completed with the start contact on the drum which produces a trigger voltage to initiate operation of the start stop multi-vibrator 112. This multi-vibrator sends a signal to the intensifier tube circuit 113 to raise the voltage of the grid of the cathode ray tube to turn on its beam. At the same time that the cathode ray tube is turned on a trigger pulse is sent to the signal initiate thyratron 114 which operates a relay 115 and a solenoid 116. The relay 115 has a pair of contacts 117 which can be used to initiate a transient that is to be recorded. The solenoid 116 controls the shutter 118 so that the image of the time lines from a synchronous time lines marker may be focused upon the recording film 51.

Recording then continues until the "end" contact of the drum completes a circuit to send a signal to the multivibrator 112. This returns the multi-vibrator to its original position to deintensify the tubes and to actuate the deactivating thyratron 119 which controls a relay 121 and a solenoid 122. The solenoid 122 moves the shutter 120 to the closed position. The relay 121 closes its contacts to complete a circuit to the intensifier tube circuit 113 whereby the intensity of the cathode ray is reduced. The particular phenomenon to be recorded is picked up by a suitable circuit arrangement which supplies potential to the recording element amplifier 123 to supply potential to the other deflecting anodes of the cathode ray tube 101 to produce the record on the film.

Figure 5:
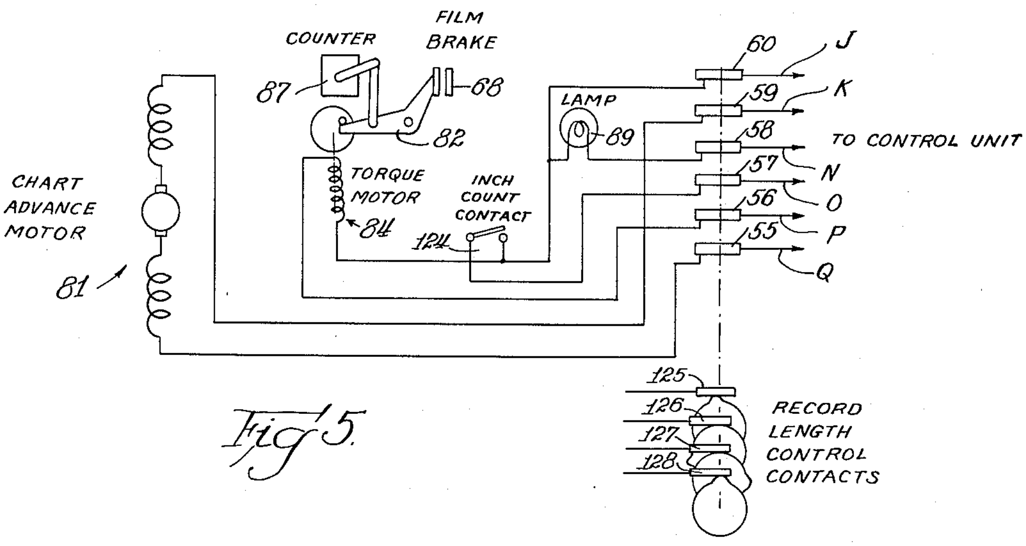
Figure 5 is a circuit diagram pertaining to the apparatus shown in Figure 3.

Figure 5 is an electrical circuit diagram of the mechanism carried by the recording drum. It will be noted that the sprocket 71 actuates the inch count contact 124 which is connected by the slip rings 57 and 58. The lamp 89 is connected by the slip rings 59 and 60. Mounted on the end of the shafts carrying slip rings 55 through 60 are the contacts 125, 126, 127 and 128 corresponding to the indicated contacts in the block diagram of Figure 4. Suitable conductors from the slip rings 55 to 60 extend to the control unit of the panel 19 of Figure 1.

Figure 6:
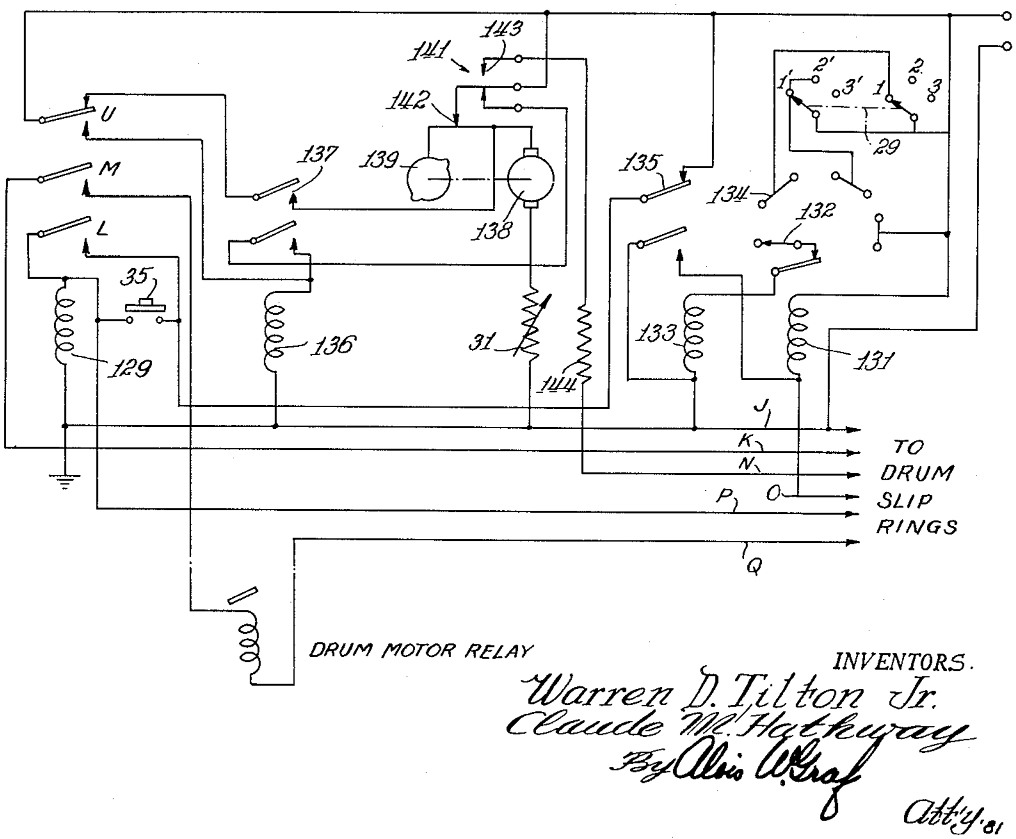
Figure 6 is a circuit diagram of a control for the circuit of Figure 5.

The principal parts of the circuit of the control unit 19 are shown in the circuit diagram of Figure 6. When the chart advance button 35 is pressed momentarily a circuit is completed to energize a relay 129 designated as a motor control relay which controls the operation of the chart advance motor 81 shown in Figure 5. The relay 129 locks itself into circuit when its lower contacts are closed. The middle set of contacts 129 supply alternating current to the chart advance motor 81. The motor 81 continues to operate until the inch count contact 124 has periodically energized the stepping relay so as to move the switch arm 132 to the proper conductive segment controlled by the selector switch 29 at which time the turn-off relay 133 is energized. If, for example, the record length selector were set for a one foot length of film the switch arm 132 would complete a circuit with the contacts or conductive segment 134 thus to energize the relay 133 which in turn deenergizes the relay 129 by interrupting the normally closed contacts 135. The stepping relay 131 is so arranged that it recycles itself to its initiate position shown in the circuit diagram of Figure 6.

At the same time that the chart advance motor 81 was started the torque motor 84 was energized by the lower contacts of the relay 129 which thereby released the film brake 68 and actuated the counter 87.

The upper contacts of the motor control relay 129 closed a circuit to energize the record number relay 136. The relay 136 locks itself into circuit by the closing of its lower pair of contacts. When the motor control relay 129 is deenergized its uppermost contacts complete a circuit through the upper contacts 137 of the relay 136 to energize a cam switch motor 138 which continues to operate until a cam 139 activates a switch 141. When the switch 141 is activated a circuit through the relay 136 is interrupted. The motor 138 continues to run since it is receiving current from contacts 142 and 143. Contact 143 is connected through a resistor 144 to slip ring 58 so that the lamp receives current for the time that the cam switch 141 is activated. After the cam has rotated so that its lobe does not lift the switch, the lamp goes out and the cam motor 138 stops. The record number exposure control 31 determines the speed of operation of the cam switch motor 138, and hence the intensity of the printed number on the film is controlled.

While for the purpose of illustrating and describing the present invention certain particular embodiments and circuit arrangements have been indicated and shown in the drawings, it is to be understood that the invention is not to be limited thereby since such embodiments and variations are contemplated as may be commensurate with the spirit and scope of the invention set forth in the accompanying claims.

We claim as our invention:

1. A drum recorder for oscillographs comprising a housing containing a motor driven drum for holding a photographic film about its periphery, a film supply reel, a film take-up reel, said reels being mounted on the axis of said drum, a motor mounted within said drum for advancing said film about the periphery of said drum, an electric switch within said drum operated by small equal increments of film advancing about said periphery, a remote stepping selector switch controlled by each operation of said latter switch, and a relay for controlling said film advancing motor, said relay being controlled by said stepping selector switch when it reaches a predetermined contact.

2. A drum recorder for oscillographs comprising a housing containing a motor driven drum for holding a photographic film about its periphery, a film supply reel, a film take-up reel, said reels being mounted on the axis of said drum, a motor mounted within said drum for advancing said film about its periphery, an electrically released brake within said drum for holding said film taut about said periphery, an electric switch within said drum operated successively by small increments of film advancing about said drum, a remote stepping selector switch controlled by each operation of said latter switch, a manually operable switch for selectively predetermining the length of operation of said stepping switch, and a relay for controlling said motor and said brake, said relay being controlled by said stepping selector switch.

3. A drum recorder for oscillographs comprising a housing containing a motor driven drum for holding a photographic film about its periphery, a film supply reel, a film take-up reel, said reels being mounted within said drum on the axis thereof, a motor mounted within said drum for advancing said film about its periphery, an electrically releasable brake within said drum for holding said film taut on said drum, an electric switch operated successively by increments of film advancing about said drum, a remote stepping selector switch controlled by said latter switch, a manually operable multi-positioned switch connected to said selector switch for selectively determing the amount of advance of said film about said drum, and a relay for controlling said motor and said brake, said relay being controlled by said latter two switches.

4. A drum recorder for oscillographs comprising a motor driven drum for supporting on its periphery a photographic film, a film supply reel, a film take-up reel, said reels being mounted within said drum on the axis thereof, a film advancing motor carried by said drum, an electrically controlled film brake within said drum for holding said film taut on the periphery of said drum, electric switch means within said drum actuated successively by movement of said film about said drum, and remote manually operable selective control means connected to said electric switch means for controlling the energization of said film advancing motor and said brake for a selected one of a plurality of predetermined time intervals.

5. A drum recorder for oscillographs comprising a motor driven drum for holding a photographic film about its periphery, said drum containing a film supply reel, a film take-up reel, said reels being mounted within said drum, a film advancing mechanism including a motor, a brake for said film, and an electric release mechanism for said brake arranged to be energized whenever said motor is energized, and means responsive to the deenergization of said motor for numbering the film which has been advanced.

6. A drum recorder for oscillographs comprising a motor driven drum for holding a photographic film about its periphery, said drum containing a film supply reel, a film take-up reel, said reels being mounted within said drum, a film advancing mechanism including a motor, a brake for said film and an electric release mechanism for said brake arranged to be energized whenever said motor is energized, and means responsive to the deenergization of said motor for numbering the film which has been advanced, said numbering means being provided with a control for determining the length of time said film will be exposed to said numbering means.

7. A drum recorder system for oscillographs comprising a record drum, a plurality of electric contacts arranged to be actuated during one revolution of said drum, one of said contacts being adapted to stop recordation by said drum and the remaining contacts being adapted to initiate recordation, a manually operable selector switch connected to said latter contacts for determining the duration of recordation, a multi-vibrator connected to receive electric signals from said contacts, and a plurality of relays controlled by said multi-vibrator to control recordation on said drum.

8. A drum recorder system for oscillographs comprising a record drum, a cathode ray tube for recording phenomena on said drum, a plurality of electric contacts arranged to be actuated during one revolution of said drum, one of said contacts being adapted to stop recordation and the remaining contacts being adapted to initiate recordation on said drum, a manually operable selector switch connected to said latter contacts for determining the duration of recordation, a multi-vibrator connected to receive electric signals from said contacts, and a relay controlled by said multi-vibrator to control the operation of said cathode ray tube.

9. A drum recorder system for oscillographs comprising a record drum, a cathode ray tube for recording phenomena on said drum, an intensifier circuit for said tube, a plurality of electric contacts arranged to be actuated during one revolution of said drum, one of said contacts stopping recordation and the remaining contacts initiating recordation on said drum, a manually operable selector switch connected to said latter contacts for determining the duration of recordation, a multi-vibrator connected to receive electric signals from said contacts, and a relay controlled by said multi-vibrator to control operation of said intensifier circuit.

10. A drum recorder system for oscillographs comprising a record drum, means for projecting a light image on said drum, an electromagnetically operated shutter interposed between said drum and said light projecting means, a plurality of electric contacts arranged to be actuated during one revolution of said drum, one of said contacts stopping recordation and the remaining contacts initiating recordation, a manually operable selector switch connected to said contacts for determining duration of recordation, a multi-vibrator connected to receive electric signals from said contacts, and relay means controlled by said multi-vibrator to operate said shutter.

References Cited in the file of this patent

UNITED STATES PATENTS

| | | |
|---|---|---|
| 2,191,662 | Huffaker | Feb. 27, 1940 |
| 2,241,232 | Wittel | May 6, 1941 |
| 2,321,812 | Heller et al. | June 15, 1943 |
| 2,328,539 | Greenleaf et al. | Sept. 7, 1943 |
| 2,328,597 | Woolf | Sept. 7, 1943 |
| 2,364,556 | Somers | Dec. 5, 1944 |
| 2,422,143 | Somers et al. | June 10, 1947 |
| 2,488,482 | Swarthout et al. | Nov. 15, 1949 |
| 2,551,597 | Hall | May 8, 1951 |
| 2,592,018 | Fairbanks | Apr. 8, 1952 |
| 2,604,376 | Tuttle et al. | July 22, 1952 |
| 2,615,641 | Scott | Oct. 28, 1952 |
| 2,629,646 | Warrick | Feb. 24, 1953 |

OTHER REFERENCES

"Control and Timing Circuits," article by John D. Goodell in August 1946 issue of "Radio News" on pages 7 et seq. of Engineering Dept.